US010264241B2

(12) United States Patent
Holden et al.

(10) Patent No.: US 10,264,241 B2
(45) Date of Patent: Apr. 16, 2019

(54) COMPLIMENTARY VIDEO CONTENT

(71) Applicant: Comcast Cable Communications, LLC, Philadelphia, PA (US)

(72) Inventors: Dan Holden, Englewood, CO (US); Austin J. Vrbas, Edgewater, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 542 days.

(21) Appl. No.: 13/765,139

(22) Filed: Feb. 12, 2013

(65) Prior Publication Data
US 2014/0225984 A1    Aug. 14, 2014

(51) Int. Cl.
| H04N 13/00 | (2018.01) |
| H04N 13/275 | (2018.01) |
| H04N 13/178 | (2018.01) |
| H04N 21/2343 | (2011.01) |
| H04N 21/2365 | (2011.01) |
| H04N 21/434 | (2011.01) |
| H04N 21/44 | (2011.01) |
| H04N 21/81 | (2011.01) |
| H04N 13/356 | (2018.01) |

(52) U.S. Cl.
CPC ......... H04N 13/275 (2018.05); H04N 13/178 (2018.05); H04N 21/2343 (2013.01); H04N 21/2365 (2013.01); H04N 21/4347 (2013.01); H04N 21/44 (2013.01); H04N 21/816 (2013.01); H04N 13/356 (2018.05)

(58) Field of Classification Search
CPC ............... H04N 13/00; H04N 13/0275; H04N 13/0066; H04N 13/0452; H04N 21/2343; H04N 21/2365; H04N 21/4347; H04N 21/44; H04N 21/816
USPC ............................................... 348/43, 42, 51
See application file for complete search history.

(56) References Cited

U.S. PATENT DOCUMENTS

| 9,077,966 B2 * | 7/2015 | Horlander | H04N 13/0029 |
| 9,357,198 B2 * | 5/2016 | Suh | H04N 21/2362 |
| 2008/0303832 A1 * | 12/2008 | Kim | G09G 3/003 345/501 |
| 2011/0012896 A1 * | 1/2011 | Ji | 345/419 |
| 2011/0102544 A1 * | 5/2011 | Kim | 348/43 |
| 2012/0019619 A1 * | 1/2012 | Suh et al. | 348/43 |
| 2012/0127282 A1 * | 5/2012 | Hwangbo | 348/51 |
| 2012/0154534 A1 * | 6/2012 | Suh et al. | 348/43 |

* cited by examiner

Primary Examiner — Trang U Tran
(74) Attorney, Agent, or Firm — Banner & Witcoff, Ltd.

(57) ABSTRACT

A method and system for viewing video content is described. In one aspect a first data stream including video content in a 2D format may be received. The first data stream may include embedded first data identifying tuning data for accessing the video content in a 3D format. The video content may be outputted in the 2D format. A notification of availability of the video content in the 3D format may be displayed to a viewer, and an instruction to tune to the video content in the 3D format may be received. The video content in the 3D format then may be outputted.

19 Claims, 8 Drawing Sheets

COMPLIMENTARY VIDEO CONTENT

BACKGROUND

The disclosure relates generally to transmission and display of content, and some aspects of the present disclosure relate to transmission, receipt, and rendering of video content in different formats, such as a 2-dimensional (2D) format and a 3-dimensional (3D) format.

Televisions may operate in conjunction with interfaces such as set top boxes that allow a user to change channels, select services, and/or interact by inputting instructions. Improvements are needed, however, for a user experience related to changing from one video format to another.

SUMMARY

In light of the foregoing background, the following presents a simplified summary of the present disclosure in order to provide a basic understanding of some features of the disclosure. This summary is provided to introduce a selection of concepts in a simplified form that are further described below. This summary is not intended to identify key features or essential features of the disclosure.

In accordance with one or more aspects of the present disclosure, a full resolution 2D signal may be generated and both the 2D and 3D version of the video content may be transmitted. Signals in the 2D format of the video content may be used to identify where a computing device may tune to in order to receive the 3D format of the video content, and signals in the 3D format of the video content may be used to identify where a computing device may tune to in order to receive the 2D format of the video content.

In one aspect, implementation includes generating two simultaneous transmissions of the same video content, one in a 2D format and one in 3D format. Additional information could be provided to the system in the form of signaling, or electronic program guide (EPG) data that would allow the system to know where to tune to find the 2D format and 3D format of the video content. When a computing device is instructed to display the video content in a 2D mode, a tuner would acquire the 2D signal; whereas, the 3D signal would be acquired when the computing device is set for a 3D mode. If a viewer first tunes to a 2D format of video content and 3D format of the video content is available, the viewer may be notified that the video content also is offered in 3D (if a rendering device is 3D capable). Toggling between 2D mode and 3D mode on the computing device may force tune between 2D and 3D video content.

BRIEF DESCRIPTION OF THE DRAWINGS

Some embodiments of the present disclosure are illustrated by way of example, and not by way of limitation, in the figures of the accompanying drawings and in which like reference numerals refer to similar elements.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Aspects of the disclosure may be operational with numerous general purpose or special purpose computing system environments or configurations. Examples of computing systems, environments, and/or configurations that may be suitable for use with features described herein include, but are not limited to, personal computers, server computers, hand-held or laptop devices, multiprocessor systems, microprocessor-based systems, set top boxes, digital video recorders, programmable consumer electronics, spatial light modulators, network (e.g., Internet) connectable display devices, network PCs, minicomputers, mainframe computers, rendering devices including television sets, distributed computing environments that include any of the above systems or devices, and the like.

The features may be described and implemented in the general context of computer-executable instructions, such as program modules, being executed by one or more computers. Generally, program modules include routines, programs, objects, components, data structures, etc. that perform particular tasks or implement particular abstract data types. Features herein may also be practiced in distributed computing environments where tasks are performed by remote processing devices that are linked through a communications network. In a distributed computing environment, program modules may be located in both local and remote computer storage media including memory storage devices. Concepts of the present disclosure may be implemented for any format or network environment capable of carrying video content.

When a user is viewing 3D formatted video content and switches to a 2D mode, problems can exist for resolution. In order to accommodate the request by a user, the left eye signal or the right eye signal of 3D formatted video content is dropped and the remaining eye signal is stretched to ½ resolution video across a display screen. Consequently, the subsequent video quality of the 2D experience is reduced substantially since it is half resolution.

Figure 1:
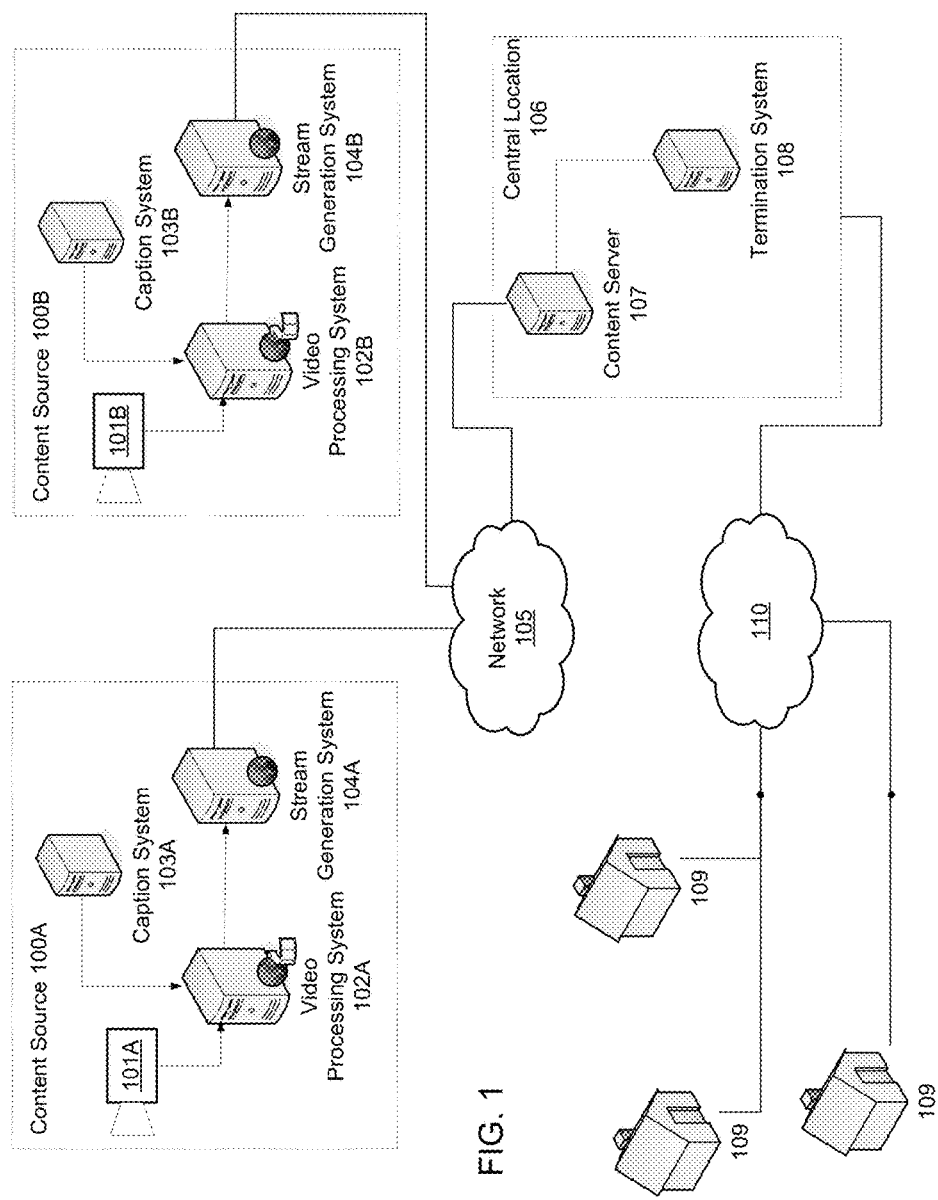
FIG. 1 illustrates an example network for streaming of video content in multiple formats in accordance with one or more aspects of the disclosure herein.

FIG. 1 illustrates an example network for generating, transmitting and/or providing access to data, such as 2D and 3D video content, in accordance with one or more features of the disclosure. Aspects of the networks allow for transmission (e.g., streaming) of 2D and/or 3D video content over a network, such as a packet switched network, such as the Internet (or any other desired public or private communication network). One or more aspects of the network may deliver video content in a 2D format and/or a 3D format to network connected devices, such as display devices. Still other aspects of the network may adapt video content to a variety of network interface devices and/or technologies, including devices capable of rendering two-dimensional (2D) and three-dimensional (3D) content. Further aspects of the network may adapt video content to a variety of distribution (e.g., network topology, network devices, etc.) characteristics. Other aspects of the network adapt data such as graphics of an output device to viewing preferences of a user.

With respect to FIG. 1, in one aspect, two-dimensional (2D) video content, such as pre-recorded or live 2D video content, may be created and/or offered by one or more 2D content sources 100A and 100B. The content sources 100A and 100B may capture 2D video content using cameras 101A and 101B. Cameras 101A and/or 101B may be any of a number of cameras or other data capture devices that are configured to capture video content. Other sources, such as storage devices or servers (e.g., video on demand servers) may be used as a source for 2D video content. In accordance with an aspect of the present disclosure, cameras 101A and 101B may be configured to capture correlated synchronized video content for a left eye and a right eye, respectively, to create 3D video. As used herein, correlated video content for a left eye and a right eye of a viewer means different video content for a left eye and a right eye of a viewer that together renders the appearance of 3D video content. Other technologies to create 3D content may be used as well.

The captured video content from cameras 101A and 101B may be used for generation of 2D and/or 3D video content for further processing and/or transmission to an end user. The data output from the cameras 101A and 101B may be sent to video processing systems 102A and 102B for initial processing of the data. Such initial processing may include any of a number of steps for processing of video data, for example, cropping of the captured data, color enhancements to the captured data, adding applications, graphics, logos, and association of audio and metadata to the captured video content.

In accordance with one or more aspects described herein, when capturing 2D video content by the cameras 101A and 101B for generation of 3D video content, image processing may be implemented to construct a 3D model of objects within the 3D video content. Scaling may be implemented mathematically to generate a plurality of different versions of the captured video content, each with a different viewing depth profile. Various manipulations of the 3D model may be used to generate the plurality of different versions of the captured video content, such as image/coordinate warping techniques.

3D content may be captured or created in any manner in the spirit of the disclosure. In the example of FIG. 1, stereoscopic images from camera 101A and 101B may be analyzed for a particular scene to find an object, such as a person. Because cameras 101A and 101B are not positioned with the exact same field of view, the two images are slightly different. As such, the location of the person in the left eye viewing point, such as from camera 101A is slightly offset from the location of the person in the right eye viewing point, such as from camera 101B. The offset may be defined by some value. Knowing this offset value, a 3D model may be constructed for defining depths of objects within the 3D video content. Scaling of the objects may be implemented to move the objects closer to or further from a viewer by using image composition techniques. In other examples, more than two image capturing devices, such as cameras 101A and 101B, may be utilized. With three or more associated viewing point images for 3D video content, a more accurate 3D model may be generated for use in generating 3D video content. Instead of utilizing a left eye viewing point image and a right eye viewing point image for construction of a 3D model, by utilizing three or more viewing point images, the 3D model may be constructed with fewer artifacts affecting the overall appearance of the objects within the 3D video content.

The construction of a 3D model and/or the generation of different versions of 3D video content may be implemented by a video processing system, such as video processing system 102A and/or video processing system 102B, and/or a content server, such as content server 107. Generated images from image capture sources, such as cameras 101A and 101B, may be combined with, e.g., annotated, metadata. The metadata may include data identifying data for accessing the content, such as versions of the same video content in a different format. For example, generated images from capture source 101A may be 2D formatted and may be embedded with metadata that includes data identifying where or how a computing device may access the same video content, but in 3D format. The embedded metadata may identify where the computing device tunes to in order to receive the same video content in 3D format.

Optional caption systems 103A and 103B may provide captioning data or other applications accompanying the video. The captioning data may, for example, contain textual transcripts of spoken words in an audio track that accompanies the video stream. Caption systems 103A and 103B also may provide textual and/or graphic data that may be inserted, for example, at corresponding time sequences to the data from video processing systems 102A and 102B. For example, data from video processing system 102A may be 2D video content corresponding to a stream of live content of a sporting event. Caption system 103A may be configured to provide captioning corresponding to audio commentary of, for example, a sports analyst made during the live sporting event and video processing system 102A may insert the captioning into one or more video streams from camera 101A. Alternatively, captioning may be provided as a separate stream from the video stream. Textual representations of the audio commentary of the sports analyst may be associated with the 2D video content by the caption system 103A. Data from the caption systems 103A, 103B and/or the video processing systems 102A, 102B may be sent to a stream generation systems 104A, 104B, to generate a digital data stream (e.g., an Internet Protocol stream) for an event captured by the cameras 101A, 101B.

An optional audio recording system may be included with and/or in place of caption systems 103A and 103B and may capture audio associated with the video signal from the cameras 101A and 101B and generate corresponding audio signals. Alternatively, cameras 101A, 101B may be adopted to capture audio. The audio captured may, for example, include spoken words in an audio track that accompanies the video stream and/or other audio associated with noises and/or other sounds. The audio recording system may generate an audio signal that may be inserted, for example, at corresponding time sequences to the captured video signals in the video processing systems 102A and 102B.

The audio track may be directly associated with the images captured in the video signal. For example, cameras 101A and/or 101B may capture and generate data of a video signal with an individual talking and the audio directly associated with the captured video may be spoken words by the individual talking in the video signal. Alternatively and/or concurrently, the audio track also may be indirectly associated with the video stream. In such an example, cameras 101A and/or 101B may capture and generate data of a video signal for a news event and the audio indirectly associated with the captured video may be spoken words by a reporter not actually shown in the captured video.

For example, data from the video processing system 102A may be video content for a left eye of a viewer corresponding to live video content of a sporting event. The audio recording system may be configured to capture and provide audio commentary of a sports analyst made during the live sporting event, for example, and an optional encoding system may encode the audio signal to the video signal generated from camera 101A. Alternatively, the audio signal may be provided as a separate signal from the video signal. The audio signal from an audio recording system and/or an encoding system may be sent to a stream generation system 104, to generate one or more digital data streams (e.g., Internet Protocol streams) for the event captured by the cameras 101A, 101B.

The stream generation system 104A and 104B may be configured to convert a stream of captured and processed video data from cameras 101A and 101B, respectively, into a single data signal, respectively, which may be compressed. The caption information added by the caption systems 103A, 103B and/or the audio signal captured by the cameras 101A, 101B and/or an optional audio recording system also may be multiplexed with the respective stream. As noted above, the generated stream may be in a digital format, such as an IP encapsulated format. Alternatively, the video content may be transmitted as a file based transmission, or another type of transmission.

In one aspect, a single or multiple encapsulated IP streams may be sent via a network 105 to any desired location. The network 105 can be any type of communication network, such as satellite, fiber optic, coaxial cable, cellular telephone, wireless (e.g., WiMAX), twisted pair telephone, etc., or any combination thereof (e.g., a hybrid fiber coaxial (HFC) network). In some embodiments, a service provider's central location 106 may be used to process and distribute content. Alternatively, content may be delivered to users directly from network 105.

The central location 106 may include, for example, a content server 107 configured to communicate with content sources 100A and 100B via network 105. The content server 107 may receive requests for 2D and/or 3D formatted video content from a user, and may use a termination system, such as termination system 108, to deliver the video content to user premises 109 through a network 110. Similar to network 105, network 110 can be any type of communication network, such as satellite, fiber optic, coaxial cable, cellular telephone, wireless (e.g., WiMAX), twisted pair telephone, etc., or any combination thereof (e.g., a hybrid fiber coaxial (HFC) network) and may include one or more components of network 105. The termination system 108 may be, for example, a cable modem termination system operating according to a standard. In an HFC network, for example, components may comply with the Data Over Cable System Interface Specification (DOCSIS), and the network 110 may be a series of coaxial cable and/or hybrid fiber/coax lines. Alternative termination systems may use optical network interface units to connect to a fiber optic communication line, digital subscriber line (DSL) interface circuits to connect to a twisted pair telephone line, satellite receiver to connect to a wireless satellite line, cellular telephone transceiver to connect to a cellular telephone network (e.g., wireless 3G, 4G, etc.), and any other desired termination system that can carry the streams described herein.

In delivery of 2D and 3D video content, a content server 107 may annotate the 2D and 3D video content with metadata. The metadata may include data identifying how to access the same video content in a different format. Thus, the 2D formatted video content may have (e.g., embedded with) data identifying data (e.g., tuning data) for accessing the same video content in 3D format. Similarly, the 3D formatted video content may have (e.g., embedded with) data identifying data (e.g., tuning data) for accessing the same video content in 2D format. In some examples, the data may be electronic program data that includes data about the video content and data for a computing device, such as a gateway described in more detail below, to tune to or otherwise receive the same video content in a different format.

With respect to FIG. 1, a 3D model of objects within 3D formatted video content may be constructed from the captured images from cameras 101A and 101B. As described herein, for each object within a 3D environment, an offset value of the object between the left eye viewing point image and the associated right eye viewing point image may be determined. The offset value may be representative of a difference in orientation of the object in the left eye viewing point image and the associated right eye viewing point image. The offset value may be utilized to define the objects within a 3D space by an x-axis point, a y-axis point, and a z-axis point. Still further, the objects may be defined by a rotation vector, e.g., what direction the object is facing and/or oriented.

Termination system 108 further may include a frame syncing system, which may be embodied as a computing device as depicted, for example, in FIG. 3 (discussed below). A frame syncing system may be configured to compare time codes for each frame of video content in a first video signal with those for each frame of video content in a second signal. In 3D environments, the frame syncing system may match frames by time codes to produce a correlated frame synced video signal in which each frame contains the left and right eye data, e.g., images, which occur at the same time in a correlated video program. In the example of 3D video content for viewers, a frame synced video signal may be utilized by an output device of a viewer. The output device may output the frame synced video signal in a manner appropriate for a corresponding viewing device to render the video as a 3D video appearance. The resulting output from the frame syncing system may be a single stream of the frame synced signal.

Options for methods of frame syncing a first video signal with a second video signal include, but are not limited to, over/under syncing, e.g., top/bottom, side by side full syncing, alternative syncing, e.g., interlaced, frame packing syncing, e.g., a full resolution top/bottom format, checkerboard syncing, line alternative full syncing, side-by-side half syncing, and 2D+ depth syncing. These example methods are illustrative and additional methods may be utilized in accordance with aspects of the disclosure herein.

In the example of an audio signal, a frame syncing system may be configured to sync the respective audio signals with the frame synced video signal. The process of syncing the audio signals by a frame syncing system may include identifying a time sequence of the frame synced video signal to insert the corresponding audio signals. Audio may come in as different audio tracks in the same 3D signal or be separately carried for each channel.

User premises, such as a home 109 described in more detail below (or any other location such as a business, institution, etc.), may be configured to receive data from network 110 or network 105. The user premises may include a network configured to receive 2D and/or 3D video content and distribute such content to one or more display devices, such as viewing devices, televisions, computers, mobile video devices, smartphones, 3D headsets, pico-projectors, etc. The viewing devices, or a centralized device, may be configured to adapt to viewing preferences of a user. For example, 3D video content for a viewing device may be configured for operation with a polarized lens headgear system. As such, a viewing device or centralized server may be configured to recognize and/or interface with the polarized lens headgear system to render an appropriate 3D video image for display.

Figure 2:
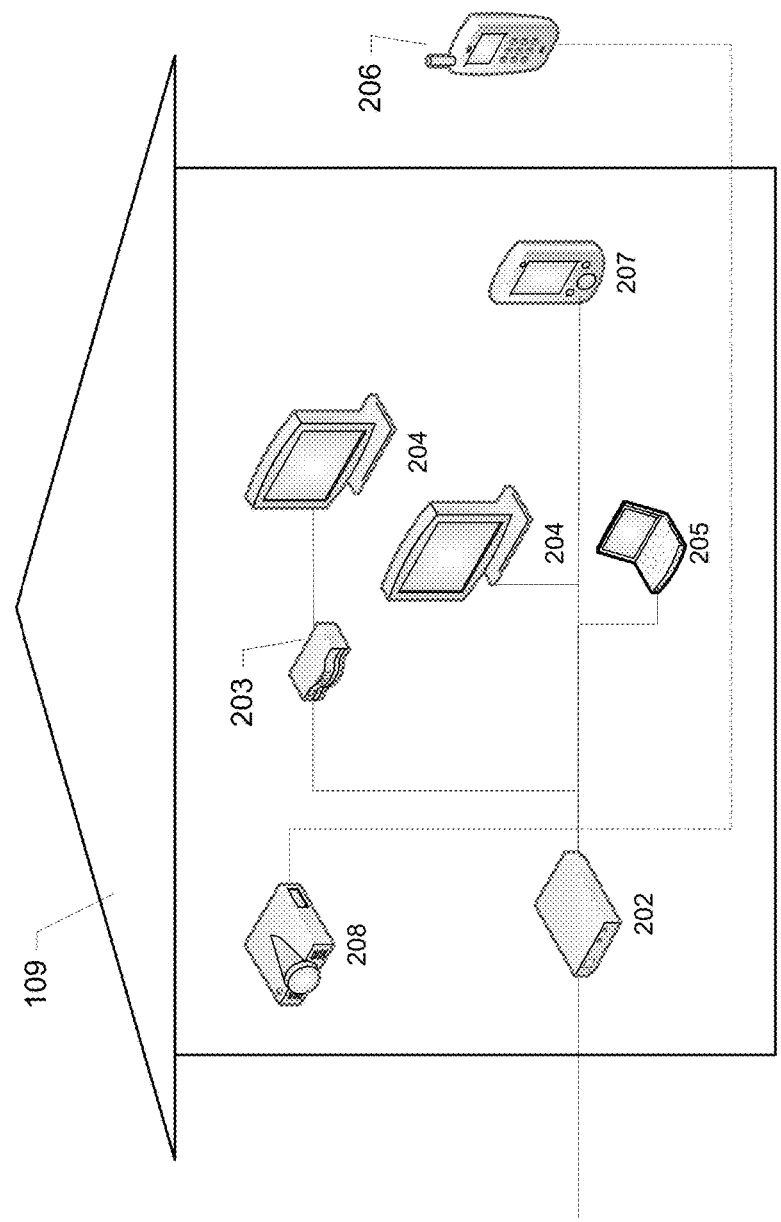
FIG. 2 illustrates an example user premises with various communication devices on which various features described herein may be implemented.

FIG. 2 illustrates a closer view of an example user premises 109, such as a home, a business, multi-dwelling unit, or institution that may be connected to an external network, such as the network 110 in FIG. 1, via an interface. An external network transmission connection (coaxial line, fiber line, wireless, etc.) may be connected to a gateway, e.g., device, 202. The gateway 202 may be a computing device configured to communicate over the network 110 with a provider's central office 106.

The gateway 202 may be connected to a variety of devices within the user premises 109, and may coordinate communications among those devices, and between the devices and networks outside the user premises 109. For example, the gateway 202 may include a modem (e.g., a DOCSIS device communicating with a CMTS in one type of network), and may offer Internet connectivity to one or more computers 205 within the user premises 109 and one or more mobile devices 206 (e.g., mobile phones, personal digital assistants, tablet computing devices and the like) within and/or outside of user premises 109. Although not shown, mobile devices 206 may communicate with gateway 202 through another device and/or network, such as network 105 and/or 110. The connectivity may also be extended to one or more wireless routers 203. For example, a wireless router may be an IEEE 802.11 router, local cordless telephone (e.g., Digital Enhanced Cordless Telephone—DECT), or any other desired type of wireless network. Various wireless devices within the home, such as a DECT phone (or a DECT interface within a cordless telephone), a portable media player 207, portable laptop computer 205, mobile devices 206, and a pico-projector 208, may communicate with the gateway 202 using a wireless router 203.

The gateway 202 may also include one or more voice device interfaces to communicate with one or more voice devices, such as telephones. The telephones may be traditional analog twisted pair telephones (in which case the gateway 202 may include a twisted pair interface), or they may be digital telephones such as a Voice Over Internet Protocol (VoIP) telephones, in which case the phones may simply communicate with the gateway 202 using a digital interface, such as an Ethernet interface.

The gateway 202 may communicate with the various devices within the user premises 109 using any desired connection and protocol. For example, a MoCA (Multimedia Over Coax Alliance) network may use an internal coaxial cable network to distribute signals to the various devices in the user premises. Alternatively, some or all of the connections may be of a variety of formats (e.g., MoCA, Ethernet, HDMI, DVI, twisted pair, etc.), depending on the particular end device being used. The connections may also be implemented wirelessly, using local wi-fi, WiMax, Bluetooth, or any other desired wireless format.

The gateway 202, which may comprise any processing, receiving, and/or displaying device, such as one or more televisions, smart phones, set-top boxes (STBs), digital video recorders (DVRs), gateways, etc., can serve as a network interface between devices in the user premises and a network, such as the network illustrated in FIG. 1. Additional details of an example gateway 202 are shown in FIG. 3, discussed further below. The gateway 202 may receive content via a transmission line (e.g., optical, coaxial, wireless, etc.), decode it, and may provide that content to users for consumption, such as for viewing 3D video content on a display of an output device 204, such as a 3D ready display such as a monitor, a tablet, or a projector, such as pico-projector 208. Alternatively, televisions, or other viewing output devices 204, may be connected to the network's transmission line directly without a separate interface device, and may perform the functions of the interface device or gateway. Any type of content, such as video, video on demand, audio, Internet data etc., can be accessed in this manner.

Figure 3:
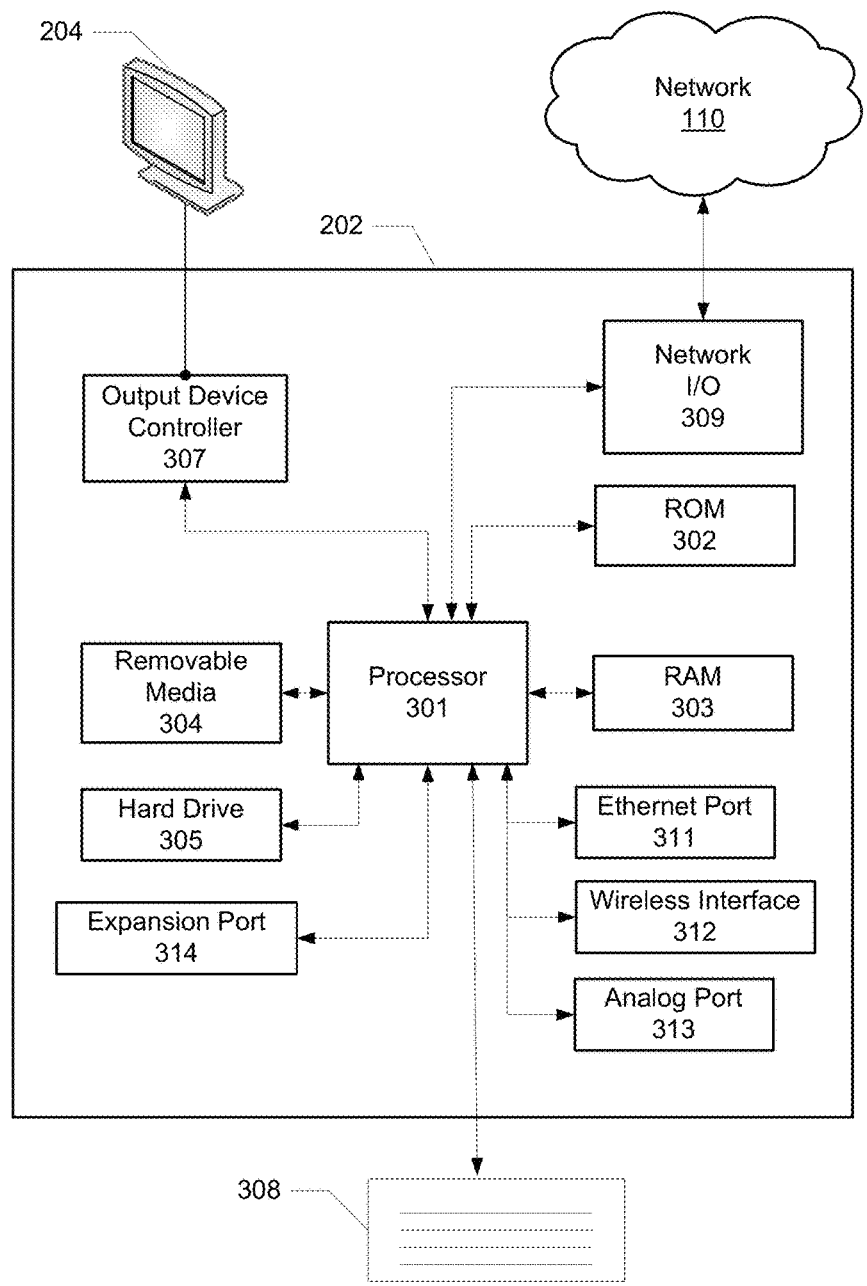
FIG. 3 illustrates an example computing device on which various features described herein may be implemented.

FIG. 3 illustrates a computing device that may be used to implement the gateway 202, although similar components (e.g., processor, memory, non-transitory computer-readable media, etc.) may be used to implement any of the devices described herein. The gateway 202 may include one or more processors 301, which may execute instructions of a computer program to perform any of the features described herein. Those instructions may be stored in any type of non-transitory computer-readable medium or memory, to configure the operation of the processor 301. For example, instructions may be stored in a read-only memory (ROM) 302, random access memory (RAM) 303, removable media 304, such as a Universal Serial Bus (USB) drive, compact disc (CD) or digital versatile disc (DVD), floppy disk drive, or any other desired electronic storage medium. Instructions may also be stored in an attached (or internal) hard drive 305. Gateway 202 may be configured to process two or more separate signals as well, e.g., dual tuner capabilities. For 2D formatted video content, gateway 202 may be configured to combine two 2D signals rather than receive a combined signal from a headend or central office.

The gateway 202 may include or be connected to one or more output devices, such as a display 204 (or, e.g., an external television that may be connected to a set-top box), and may include one or more output device controllers 307, such as a video processor. There may also be one or more user input devices 308, such as a wired or wireless remote control, keyboard, mouse, touch screen, microphone, etc. The gateway 202 also may include one or more network input/output circuits 309, such as a network card to communicate with an external network, such as network 110 in FIG. 1 and/or a termination system, such as termination system 108 in FIG. 1. The physical interface between the gateway 202 and a network, such as network 110 may be a wired interface, wireless interface, or a combination of the two. In some embodiments, the physical interface of the gateway 202 may include a modem (e.g., a cable modem), and the external network may include a television content distribution system, such as a wireless or an HFC distribution system (e.g., a DOCSIS network).

The gateway 202 may include a variety of communication ports or interfaces to communicate with the various home devices. The ports may include, for example, an Ethernet port 311, a wireless interface 312, an analog port 313, and any other port used to communicate with devices in the user premises. The gateway 202 may also include one or more expansion ports 314. The expansion port 314 may allow the user to insert an expansion module to expand the capabilities of the gateway 202. As an example, the expansion port 314 may be a Universal Serial Bus (USB) port, and can accept various USB expansion devices. The expansion devices may include memory, general purpose and dedicated processors, radios, software and/or I/O modules that add processing capabilities to the gateway 202. The expansions can add any desired type of functionality, several of which are discussed further below.

Aspects of the present disclosure as described herein illustrate examples in transmitting, e.g., simulcasting, video content either live or based upon a timed simulcast. Aspects of the present disclosure may be implemented with any other transmission techniques, e.g., unicasting such as in a video on demand system, etc.

Figure 4:
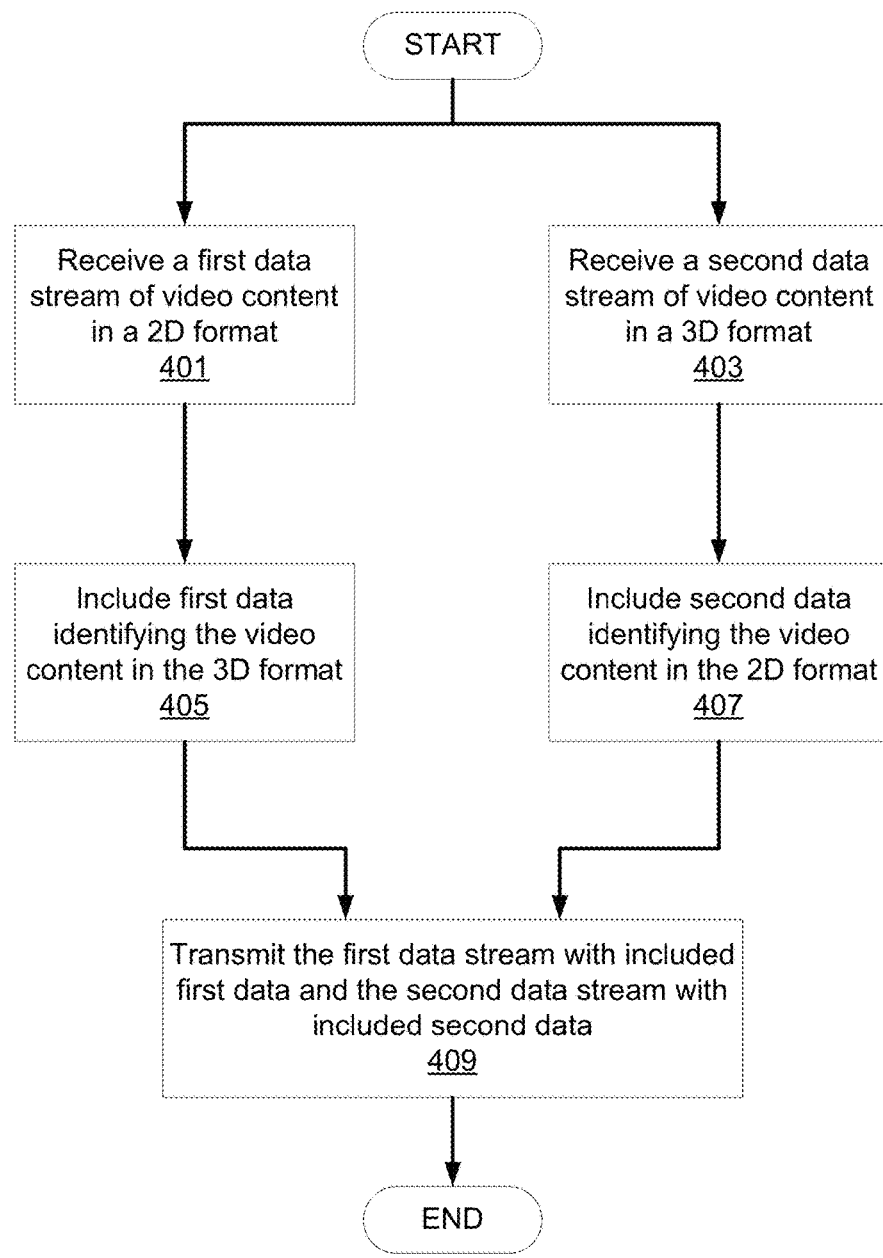
FIG. 4 is an illustrative flowchart of a method for generation and transmission of data streams in accordance with one or more aspects of the disclosure herein.

FIG. 4 is an illustrative flowchart of a method for presentation of video content in accordance with one or more aspects of the disclosure herein. FIG. 4 illustrates an example where a device, such as content server 107 in FIG. 1, may be configured to output video content. In step 401, a device may receive a first data stream of video content in a 2D format, such as from a content source 100A via the network 105 in FIG. 1. The device implementing step 401 may be a content server, such as content server 107, or any other suitable device. In 403, a device may receive a second data stream of video content in a 3D format, such as from a content source 100B via the network 105 in FIG. 1 and/or from two different content sources, one for a left eye and one for a right eye of a viewer. Although streaming data is discussed in the exemplary embodiment, any other method for transferring video data may be used. In this example, the video content in the second stream is the same video content as in the first stream, but is in 3D format as opposed to 2D format. The device implementing step 403 may be a content server, such as content server 107, and may be the same content server as utilized in step 401. In an example, the computing device implementing steps 401 and 403 may be the same device or located together with the content source.

Proceeding to step 405, the first data stream of video content may be combined (e.g., embedded) with first data identifying tuning data or other means for accessing the same video content in a different format. Since the first data stream of video content is in a 2D format from step 401, the 2D formatted video content may carry data identifying how to access the same video content in 3D format. In the example of FIG. 4, the first data in step 405 may be data identifying data for accessing the second data stream of video content in the 3D format in step 403. The device implementing step 405 may be a computing device such as a content server, and may be the same content server as utilized in steps 401 and/or 403.

Similarly, in step 407, the second data stream of video content may be processed to include (e.g., embedded with) second data identifying data for accessing the same video content in a different format. Since the second data stream of video content is in a 3D format from step 403, the 3D formatted video content may carry data identifying how to access the same video content in 2D format. In the example of FIG. 4, the second data in step 407 may be data identifying tuning data for accessing the second data stream of video content in the 2D format in step 401. The device implementing step 407 may be a computing device such as content server, and may be the same content server as utilized in steps 401, 403, and/or 405.

The first data or the second data may be inserted (.e.g., embedded) into a stream as part of a packet of data. The data, e.g., identifying tuning data, may be embedded with the header and payload. In some examples, the embedded data may be electronic program data that includes data about the video content and data for a computing device, such as gateway 202, to tune to receive the same video content in a different format. As described below, the computing device that receives a data stream of video content in one format, e.g., 2D format, may utilize the embedded data identifying tuning data for accessing the video content in another format in order to switch to the video content in the other format, e.g., 3D format.

Moving to step 409, a computing device may transmit the first data stream, with the embedded first data identifying tuning data for accessing the same video content in a 3D format and the second data stream, with the embedded second data identifying tuning data for accessing the same video content in a 2D format. The device implementing step 409 may be a computing device such as a content server, such as content server 107. The first data stream and the second data stream may be transmitted in step 409 simultaneously or at different times. The 2D video content and the 3D video content may be delivered over a network to an end user, such as through network 110 to an end user at user premises 109 in FIG. 1.

Figure 6A:
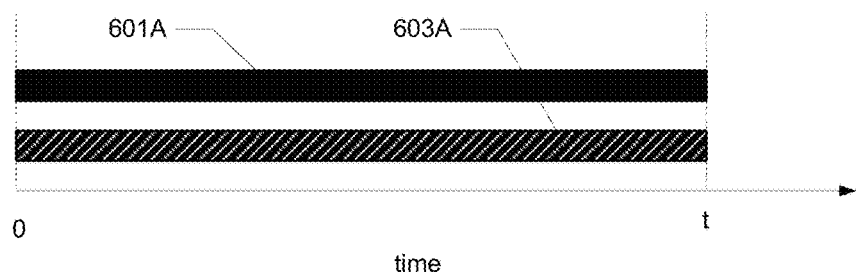
FIGS. 6A-6C are illustrative time sequences for streaming video content in accordance with one or more aspects of the present disclosure.
Figure 6B:
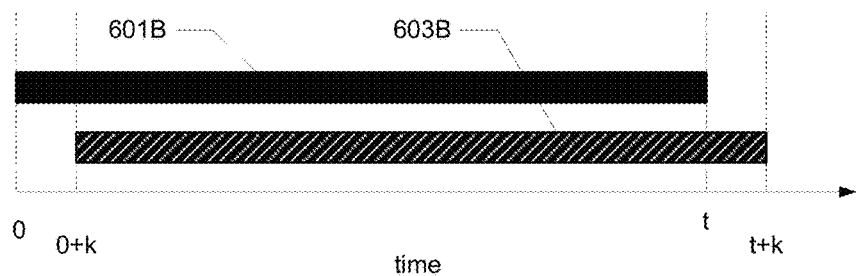
Figure 6C:
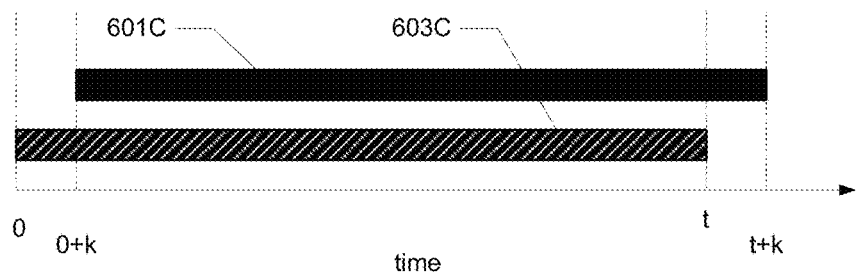

Thus in some examples, the video content in 2D format may be streaming at a same time sequence as the video content in 3D format while, in other examples, the video content in the 2D format may be streaming at an earlier or later time sequence. FIGS. 6A-6C illustrate such examples. In FIG. 6A, a stream of video content in a 2D format 601A may be transmitted during a period of time 0 to time t. Simultaneously, another stream of the video content in a 3D format 603A may be transmitted during the same period of time 0 to time t. Thus, in a situation in which a request to switch from 2D format to 3D format or vice versa is received, the switch will have a viewer at the same point in time in the video content.

In FIG. 6B, a stream of video content in a 2D format 601B may be transmitted during a period of time 0 to time t. Another stream of the video content in a 3D format 603B may be transmitted at a time k offset from the start of the transmission of the video content in 2D format 601B, during a period of time 0+k to time t+k. Thus, in a situation in which a request to switch from 2D format 601B to 3D format 603B is received, the switch will have a viewer change from a first point in time in the video content in 2D format to an earlier point in time in the video content in 3D format. Similarly, in a situation in which a request to switch from 3D format 603B to 2D format 601B is received, the switch will have a viewer change from a first point of time in the video content in 3D format to a later point in time in the video content in 2D format.

In FIG. 6C, a stream of video content in a 3D format 603C may be transmitted during a period of time 0 to time t. Another stream of the video content in a 2D format 601C may be transmitted at a time k offset from the start of the transmission of the video content in 3D format 603C, during a period of time 0+k to time t+k. Thus, in a situation in which a request to switch from 3D format 603C to 2D format 601C is received, the switch will have a viewer change from a first point of time in the video content in 3D format to an earlier point in time in the video content in 2D format. Similarly, in a situation in which a request to switch from 2D format 601C to 3D format 603C is received, the switch will have a viewer change from a first point of time in the video content in 2D format to a later point in time in the video content in 3D format.

Figure 5:
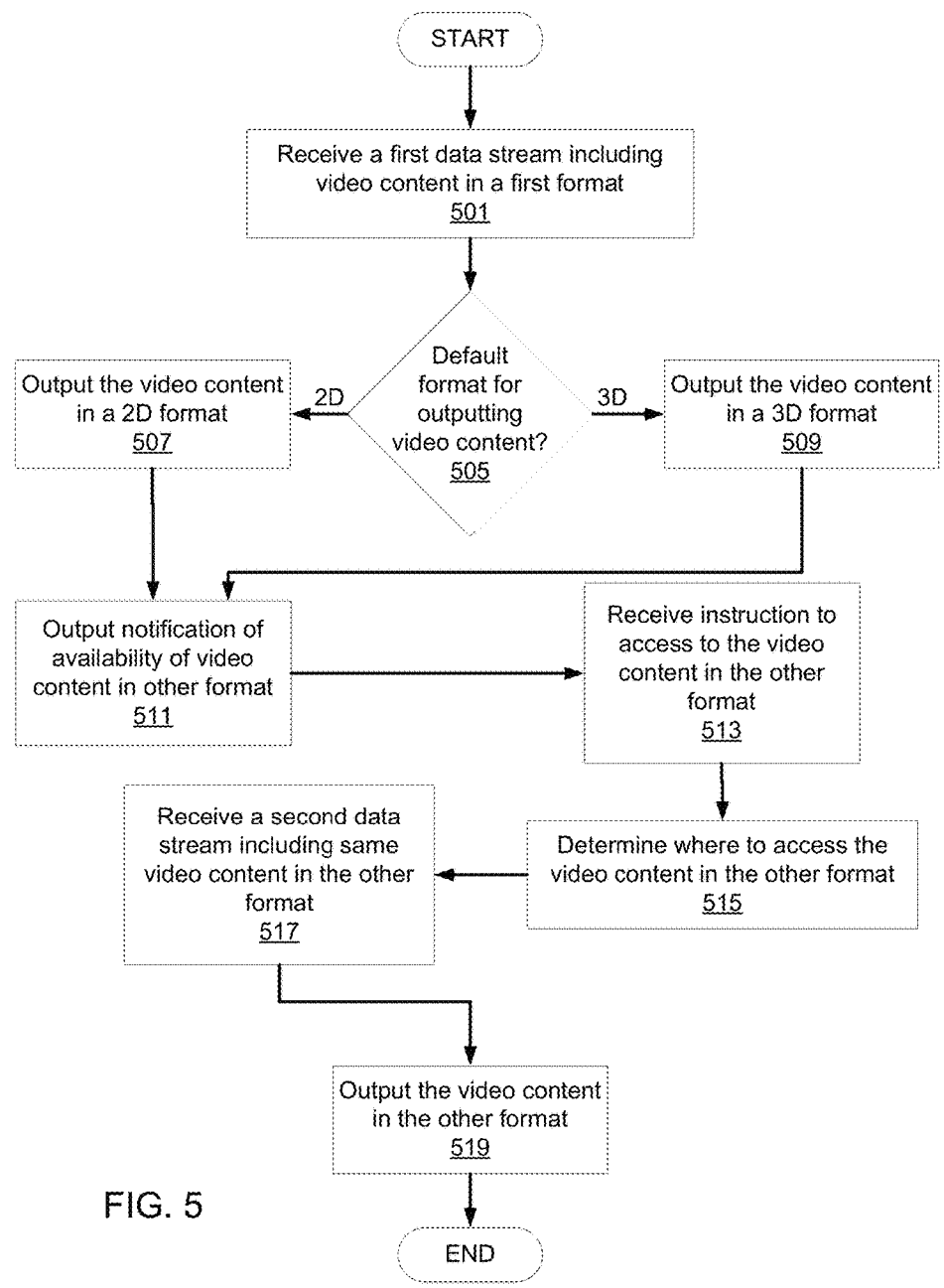
FIG. 5 is an illustrative flowchart of a method for outputting video content in accordance with one or more aspects of the present disclosure.

FIG. 5 is an illustrative flowchart of a method for a device, such as gateway 202 or display devices in FIG. 2, to output video content in accordance with one or more aspects of the disclosure. In step 501, a computing device may receive a first data stream of video content in a first format, such as 2D format from a content server 107 via the network 110 in FIG. 1. The device implementing step 501 may be a computing device, such as a gateway 202. In step 505, a determination may be made as to whether the default format for outputting, rendering or displaying video content is first type or second type, such as 2D video content or 3D video content. A 3D ready television may be configured to a default output of 2D format or 3D format based upon a preference of a viewer. If the default is 2D format, the process moves to step 507. If the default is 3D format, the process moves to step 509.

In step 507, the video content in 2D format is outputted from the computing device or presented to or by a display device. In one or more examples, the video content in 2D format may be outputted, with full resolution for example. Step 507 may be implemented by gateway 202 or a display device, for example. In step 509, the video content in 3D format is outputted from the computing device or presented to or by a display device. In one or more examples, the video content in 3D format may be outputted with half resolution. Video content in 3D format outputted with half resolution means that half of the original video content data is thrown out or not used in the output or rendering or display process. In such examples, the first data stream received in step 505 includes the video content in 3D format with half resolution. There is no need for stretching of one video signal, such as the left eye signal, associated with video content in 3D format since it is received in half resolution form in step 501. Step 509 may be implemented by gateway 202 or to a display device, for example. Steps 507 or 509 both may lead to step 511. In step 511, a notification of the availability of the video content in the other format may be outputted or presented. The notification may be a user interface, accessible by a viewer, to access the video content in the other format. If proceeding from step 507, the notification in step 511 may be a user interface that the same video content is available in 3D format. Similarly, if proceeding from step 509, the notification in step 511 may be a user interface that the same video content is available in 2D format.

Figure 7:
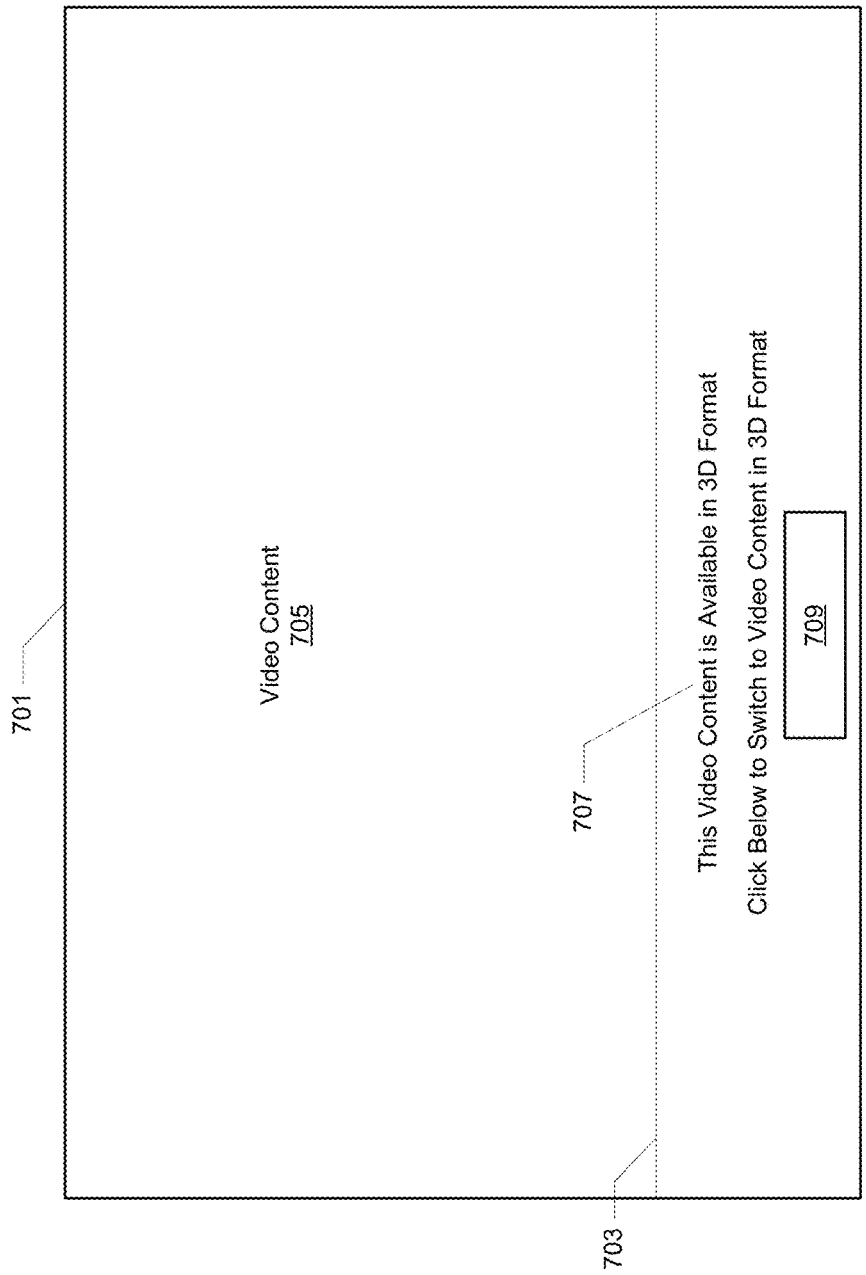
FIG. 7 is an illustrative user interface for a viewer to be notified of and/or switch to alternative formats for video content.

FIG. 7 is an illustrative user interface for a viewer to be notified of and/or switch to alternative formats for video content. A display device 701 associated with a gateway may output video content in 2D format 705. A notification 703 may be generated and outputted as a user interface that includes an instruction 707 for accessing the same video content in 3D format. An access switch 709 may be included to allow a viewer to switch to the same video content in 3D format. Upon activation of switch 709, the video content in 3D format may be outputted to the display device 701. A viewer may access switch 709 by utilizing an input device, such as input device 308 in FIG. 3.

Returning to FIG. 5, in step 513, the computing device receives an instruction to access the video content in the other format. If the default format was 2D format from step 507, then the instruction in step 513 is to access the video content in 3D format. Alternatively if the default format was 3D format from step 509, then the instruction in step 513 is to access the video content in 2D format. The instruction to access (e.g., tune to) the video content in the other format may be in response to receipt of a user-defined request to access the video content in the other format, such as by accessing switch 709 in FIG. 7.

In step 515, the computing device may determine where to access the video content in the other format based upon data included, e.g., embedded, in the first data stream received in step 501. The included data in the first data stream may include data identifying how to access (e.g., by tuning) the same video content in the other format. Thus, if the first data stream includes video content in 2D format, the included data in the first data stream includes data identifying data for accessing the same video content in 3D format. The data identifying data for accessing the same video content in 3D format may be data identifying a specific frequency for a tuner of the computing device to tune to in order to receive the video data in 3D format.

In step 517, the computing device may receive a second data stream of video content in the other format, such as 3D format from a content server 107 via the network 110 in FIG. 1. The device implementing step 517 may be a computing device, such as a gateway 202 or a display device. In step 519, the video content in 3D format is outputted from the computing device. In one or more examples, the video content in 3D format may be outputted with half resolution. In such examples, the second data stream received in 517 includes the video content in 3D format with half resolution. There is no need for stretching of one video signal, such as the left eye signal, associated with video content in 3D format since it is received in half resolution form in step 517. One or more steps of the process in FIG. 5 may be implemented again for a viewer to switch back to a default video content format and/or to toggle back and forth between video content in 2D format and 3D format.

In yet another embodiment, a first data stream as described herein may be video content in 2D format with full resolution and a second data stream as described herein may be video content in 3D format that is the right eye data stream in half resolution. The two streams may be simulcast, or otherwise transmitted, with the included data regarding the other data stream. Such an embodiment drops the transmission rate of the 3D data stream by 50% since the 3D content is for the right eye only, not 3D content for both the right eye and the left eye. With respect to the 3D format, only 50%, the right eye in this example, is transmitted as part of the simulcast streams. A device then may receive a data stream of video content in 3D format for the corresponding left eye with the left eye stream with full resolution. The gateway may process the full resolution to half resolution and then frame sync the half resolution version of the left eye signal with the half resolution signal of the right eye, the second data stream, in order to generate a frame synced data stream creating the 3D experience. Alternatively, the second data stream in this example may be the left eye signal and the separately received additional data stream that is processed to half resolution may be the right eye stream.

Figure 8:
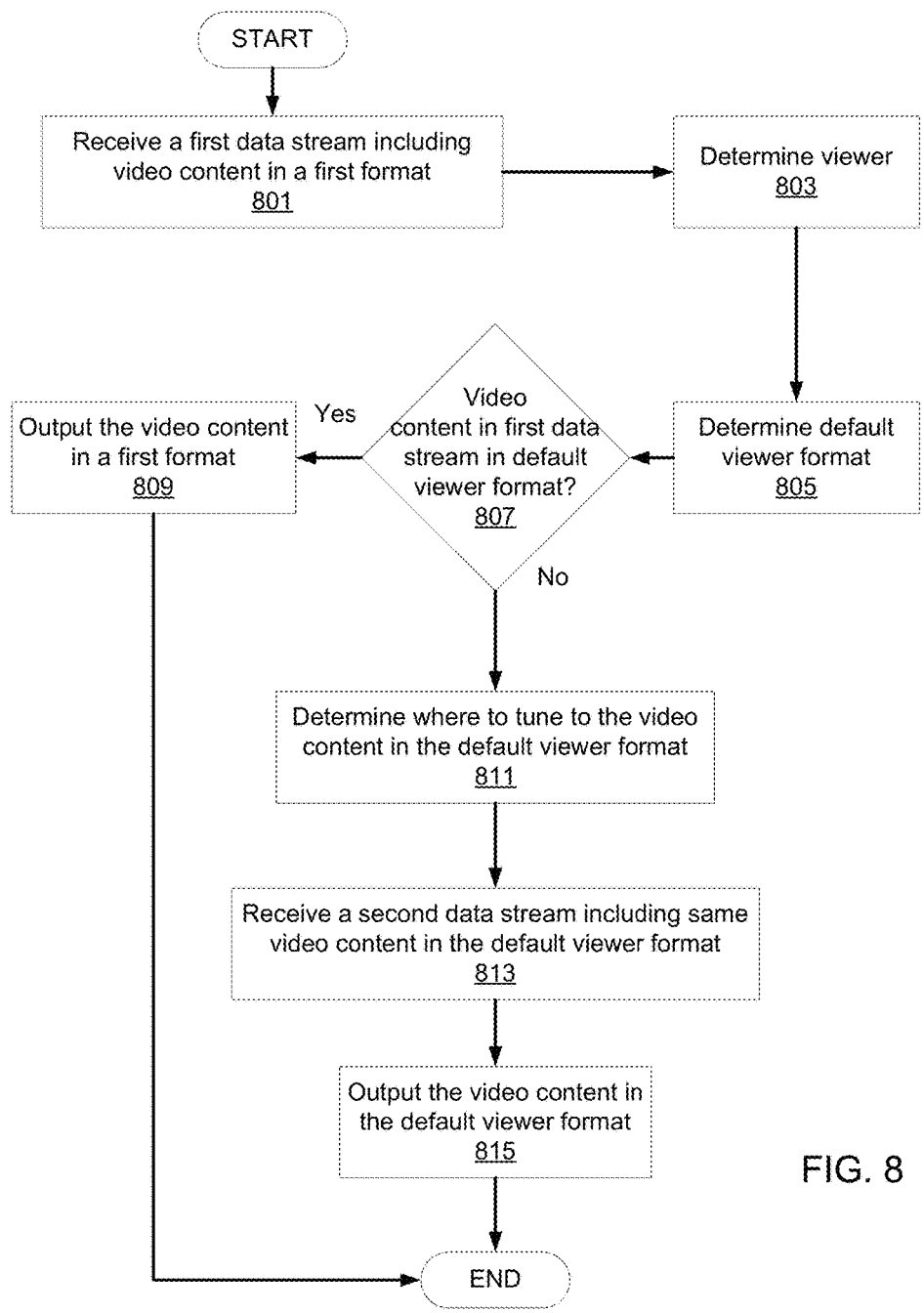
FIG. 8 is another illustrative flowchart of a method for outputting video content in accordance with one or more aspects of the present disclosure.

FIG. 8 is another illustrative flowchart of a method for a device, such as gateway 202 in FIG. 2, to output video content in accordance with one or more aspects of the disclosure herein. In step 801, a computing device may receive a first data stream of video content in a first format, such as 2D format. The device implementing step 801 may be a computing device, such as a gateway 202 or display device, which may output video content to a display device, such as display device 204 in FIG. 2. In step 803, a viewer or user of the video content may be determined. Any of a number of manners may exist in order to determine a viewer of video content. For example, in initially turning on a display device associated with the computing device, the computing device may determine the viewer. A camera may be linked to the computing device to capture biographical data on a viewer. A fingerprint scanner may be included in an input/output device associated with the computing device. In other examples, a prompt may be displayed to a viewer to enter in data identifying the viewer, such as a name, password, or other data.

Proceeding to step 805, a default viewer format may be determined. Step 805 may be implemented by gateway 202 as shown in FIG. 2 or other devices. A profile of different viewers associated with the computing device may be maintained in the computing device. For example, a table of viewers by name and password may be stored in a memory, such as RAM 303 in FIG. 3. Such a table may include data specifying the format of video content that the viewer wants to see as a default. In some cases the viewer may want to see video content, whenever available, in 3D format and, as such, would have 3D format as the default format for outputting video content. In other cases the viewer may only want to see video content in 2D format. For example, such a view may not want to wear active shutter glasses in order to watch video content in 3D format. Therefore the table would specify that such a viewer has a default viewer format of 2D format. In still other examples, the default format for a viewer may depend on other criteria. For example, a view may have a first default viewer format for sporting events, such as a football game, while having a second different default viewer format for news programs, such as the local or nightly news. As such, the determination of the default view format may take into account a number of different criteria including time of day, time of week, the type of video content, e.g., live, pre-recorded, a sporting event, and animated, and/or other criteria to be associated with a particular viewer.

In step 807, a determination may be made as to whether the video content in the first data steam received in step 801 is in the default viewer format. If the first format in the first data stream is in the default viewer format, such as 2D, the process moves to step 809, where the video content in the first format is outputted from the computing device. Step 809 may be implemented by gateway 202 outputting to a display device 204 in FIG. 3 or by a display device itself. If the first format in the first data stream is not in the default viewer format, the process moves to step 811. For example, if the first format is 2D format and the default viewer format is 3D format, the process would proceed to 811.

In step 811, the computing device may determine where to find, e.g., tune to, the video content in the default viewer format based upon data embedded in the first data stream received in step 801. The embedded data in the first data stream may include data identifying tuning data for accessing the same video content in the default viewer format. Thus, if the first data stream includes video content in 2D format, the embedded data in the first data stream may include data identifying tuning data for accessing the same video content in 3D format. The data identifying tuning data may be data identifying a specific frequency for a tuner of the computing device to tune to in order to receive the video data in 3D format.

In step 813, the computing device may receive a second data stream of video content in the default viewer format, such as 3D format from a content server 107 via the network 110 in FIG. 1. The device implementing step 813 may be a computing device, such as a gateway 202. In step 815, the video content in the default viewer format, e.g., 3D format, is outputted from the computing device. Step 815 may be implemented by gateway 202 outputting to a display device 204 in FIG. 3.

Other embodiments include numerous variations on the devices and techniques described above. Embodiments of the disclosure include a non-transitory machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause one or more devices to carry out operations such as are described herein.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present disclosure in various embodiments and with various modifications as are suited to the particular use contemplated. The features of the embodiments described herein may be combined in all possible combinations of methods, apparatuses, modules, systems, and non-transitory machine-readable storage media. Any and all permutations of features from above-described embodiments are the within the scope of the disclosure.

The invention claimed is:

1. A method comprising:
receiving, by a computing device, a first data stream and a second data stream, wherein the first data stream comprises video content in a 2D format, the first data stream further comprising embedded first data that indicates the second data stream, and wherein the second data stream comprises the video content in a 3D format, the second data stream further comprising embedded second data that indicates the first data stream, wherein the embedded first data and the embedded second data are different;
identifying a viewer of the video content;
determining, based on the viewer, a default viewer format for outputting the video content, the default viewer format comprising the 2D format;
outputting the video content in the 2D format;
receiving, by the computing device, an instruction to access the video content in the 3D format;
determining, based on the embedded first data, where to access the video content in the 3D format; and
outputting the video content in the 3D format.

2. The method of claim 1, further comprising outputting a notification of availability of the video content in the 3D format.

3. The method of claim 2, wherein the notification comprises a user interface for accessing the video content in the 3D format.

4. The method of claim 1, wherein the embedded first data is embedded electronic program guide data.

5. The method of claim 1, wherein the determining the default viewer format is further based on a type of the video content.

6. The method of claim 2, wherein the receiving the instruction to access the video content in the 3D format is based on an input received after the outputting of the notification.

7. The method of claim 1, wherein the video content in the 2D format is full resolution and the video content in the 3D format is half resolution.

8. The method of claim 1, wherein a header of the first data stream comprises at least a portion of the embedded first data.

9. The method of claim 1, wherein:
the embedded first data comprises a first frequency corresponding to the second data stream, and
the embedded second data comprises a second frequency corresponding to the first data stream.

10. The method of claim 9, wherein receiving the first data stream comprises tuning to the second frequency, and receiving the second data stream comprises tuning to the first frequency.

11. The method of claim 1, wherein the first data stream and the second data stream are different data streams.

12. The method of claim 3, wherein the identifying the viewer of the video content comprises receiving viewer identification data entered through the user interface.

13. The method of claim 1, wherein the identifying the viewer of the video content comprises receiving viewer identification data from a camera device.

14. The method of claim 1, wherein the identifying the viewer of the video content comprises receiving viewer identification data from a fingerprint scanner of an input/output device.

15. A method comprising:
receiving, by a computing device, a first data stream comprising video content in a 2D format and a second data stream comprising the video content in a 3D format;
embedding, in the first data stream, first data identifying the second data stream;
embedding, in the second data stream, second data identifying the first data stream, wherein the first data and the second data are different;
identifying a viewer of the video content;
determining, based on the viewer, a default viewer format for outputting the video content, the default viewer format comprising the 2D format;
outputting the video content in the 2D format;
receiving, by the computing device, an instruction to access the video content in the 3D format;
determining, based on the embedded first data, where to access the video content in the 3D format; and
outputting the video content in the 3D format.

16. The method of claim 15, further comprising:
sending the first data stream with the embedded first data; and
sending the second data stream with the embedded second data.

17. The method of claim 15, further comprising simultaneously sending:
the first data stream with the embedded first data; and
the second data stream with the embedded second data.

18. The method of claim 16, wherein the sending the first data stream comprises sending at least a portion of the first data stream prior to the sending the second data stream.

19. An apparatus comprising:
one or more processors; and
memory storing instructions that, when executed by the one or more processors, cause the apparatus to:
receive a first data stream and a second data stream, wherein the first data stream comprises video content in a 2D format, the first data stream further comprising first embedded tuning data for tuning to the video content in a 3D format, and wherein the second data stream comprises the video content in the 3D format, the second data stream further comprising second embedded tuning data for tuning to the video content in the 2D format, wherein the first embedded tuning data and the second embedded tuning data are different;
identify a viewer of the video content;
determine, based on identifying the viewer, a default format for outputting the video content, wherein the default format comprises the 2D format or the 3D format; and
output the video content in the default format.

* * * * *